(12) United States Patent
Andersson et al.

(10) Patent No.: US 11,796,975 B2
(45) Date of Patent: Oct. 24, 2023

(54) NETWORK CENTRIC PROCESS CONTROL

(71) Applicant: ABB Schweiz AG, Baden (CH)

(72) Inventors: Staffan Andersson, Lund (SE); Hans Thilderkvist, Malmö (SE)

(73) Assignee: ABB Schweiz AG, Baden (CH)

( * ) Notice: Subject to any disclaimer, the term of this patent is extended or adjusted under 35 U.S.C. 154(b) by 327 days.

(21) Appl. No.: 16/795,208

(22) Filed: Feb. 19, 2020

(65) Prior Publication Data

US 2020/0278649 A1 Sep. 3, 2020

(30) Foreign Application Priority Data

Mar. 1, 2019 (EP) .................................. 19160285

(51) Int. Cl.
*H04L 61/00* (2022.01)
*G05B 19/042* (2006.01)
*H04L 61/5069* (2022.01)

(52) U.S. Cl.
CPC ........ *G05B 19/042* (2013.01); *H04L 61/5069* (2022.05); *G05B 2219/25198* (2013.01)

(58) Field of Classification Search
CPC ........ G05B 19/042; G05B 2219/25198; H04L 61/2069; H04L 67/12; H04L 67/125; H04L 67/28; H04L 67/025; H04L 67/06; H04L 67/2866
See application file for complete search history.

(56) References Cited

U.S. PATENT DOCUMENTS

2017/0102690 A1* 4/2017 Sait ........................ H04L 67/10
2018/0075149 A1* 3/2018 Trossen .............. G06F 16/9535

OTHER PUBLICATIONS

Pardo-Castellote (Pardo-Castellote G. et al: "OMG data-distribution service: architectural overview", Distributed Computing Systems Workshops, 2003. Proceedings. 23rd International Conference on 052003).*

(Continued)

*Primary Examiner* — Lakeram Jangbahadur
(74) *Attorney, Agent, or Firm* — WHITMYER IP GROUP LLC

(57) ABSTRACT

A method for process control in a network centric process control system. The network centric process control system includes a plurality of nodes, wherein each node includes one or more control services being a separate executable running in a separate operating system process provided by a real time operating system thereof, wherein configuration data defining a communication interface for process data between the plurality of nodes has been received from an engineering node. The method includes publishing, by one or more of the plurality of controller nodes and plurality of device nodes, process data information in a middleware service, the process data information having an identity unique in the network centric process control system, a data type for process data, and process data, wherein the middleware service being a separate executable running in a separate operating system process provided by a real time operating system thereof, and subscribing, by the one or more of the plurality of nodes, to process data information published in the middleware service. A network centric process control system, a computer program, and a computer program product thereof are also presented.

15 Claims, 9 Drawing Sheets

(56) References Cited

OTHER PUBLICATIONS

Pardo-Castellote, Gerardo, PHD; "OMG Data-Distribution Service: Architectural Overview"; 2003 Distributed Computing Systems Workshops Proceedings, 23rd International Conference; Providence, RI, USA; May 19, 2003; 7 Pages.
European Office Action; Application No. 19 160 285.3; dated Feb. 4, 2022; 11 pages.
Anonymous: "Type-length-value, Wikipedia version of Nov. 17, 2018" (Nov. 17, 2018), XP055601762, Accessed on Feb. 18, 2020: URL:https://en.wikipedia.org/w/index.php?title=Type-length-value&oldid=869210452 3 pages.
European Search Report Application No. EP 19 16 0285 Completed: Jul. 3, 2019; dated Jul. 16, 2019 10 pages.
Chinese Office Action; Application No. 202010107746.8; Complete: Jul. 13, 2023; dated Jul. 19, 2023: 4 Pages.

\* cited by examiner

NETWORK CENTRIC PROCESS CONTROL

TECHNICAL FIELD

The present disclosure relates to a method, a network centric process control system, a computer program and a computer program product for process control of a network centric process control system.

BACKGROUND

Process control systems of today have, as illustrated in FIG. 1 in a logical topology, a controller centric architecture, i.e. each controller 300c and 300d executes a set of control logic applications using IO (in/out) interfaces and devices 300e, 300f, 300g and 300h connected to the controller 300c or 300d, or via fieldbuses connected to the controller. IOs and devices are configured and scanned by the controller 300c or 300d, which makes the controller 300c or 300d dependent on knowledge about the hardware topology as well as IO, device and fieldbus specific implementations. Access of IO and device data from upper system levels is routed through the controller, and sometimes requires modifications of the control logic.

Control logic engineering 300a requires knowledge about where the IOs and devices 300e, 300f, 300g, and 300h are connected, and the IO engineering requires knowledge about where the control logic is executing. Changes in the IO engineering have an impact on the control logic engineering, and vice versa. Operations 300b are also dependent of the controller centric architecture.

Access of IO and devices connected to a different controller requires controller-to-controller communication to be configured, which has a cost in terms of extra engineering effort and performance penalty in processing capacity.

SUMMARY

One objective is to enable reduced engineering efforts and improved system performance.

According to a first aspect there is presented a method for process control in a network centric process control system. The network centric process control system comprises a plurality of nodes, wherein each node comprises one or more control services being a separate executable running in a separate operating system process provided by a real time operating system thereof, wherein configuration data defining a communication interface for process data between the plurality of nodes has been received from an engineering node. The method comprises publishing, by one or more of the plurality of nodes, process data information in the network centric process control system via a middleware service, the process data information comprising an identity unique in the network centric process control system, a data type for process data, and process data, wherein the middleware service being a separate executable running in a separate operating system process provided by a real time operating system thereof, and subscribing, by the one or more of the plurality of nodes, to process data information published in the network centric process control system via the middleware service.

The publishing and the subscribing may be bound by multicast addresses.

Process data information to be published by a control services may be copied by the control service to a middleware service interface, which in turn publishes the process data information in the network centric process control system via the middleware service and/or to another control service executing in the same node via the middleware service, and process data information subscribed by a control services may be copied by the control service from a middleware service interface, which in turn has received the process data information from the network centric process control system via the middleware service and/or from another control service executing in the same node via the middleware service. The process data information may be copied cyclically prior to each execution of control logic or IO channel scanning.

The middleware service interface may handle signal quality by overriding or substituting values in case of bad quality.

The middleware service interface may be configured to group publishing process data information in data sets, wherein each data set is assigned a multicast address.

According to a second aspect there is presented a network centric process control system. The network centric process control system comprises a plurality of nodes, wherein each node is configured to run one or more control services being a separate executable running in a separate operating system process provided by a real time operating system thereof, wherein configuration data defining a communication interface for process data between the plurality of nodes are configured to be received from an engineering node of the network centric process control system. The network centric process control system comprises a processor, and a computer program product storing instructions that, when executed by the processor, causes the network centric process control system to publish process data information in the network centric process control system via a middleware service, the process data information comprising an identity unique in the network centric process control system, a data type for process data, and process data, wherein the middleware service is configured to be a separate executable running in a separate operating system process provided by a real time operating system thereof, and to subscribe to process data information published in the network centric process control system via the middleware service.

The publishing and the subscribing may be bound by multicast addresses.

Process data information to be published by a control services may be configured to be copied by the control service to a middleware service interface, which in turn is configured to publish the process data information in the network centric process control system via the middleware service and/or to another control service executing in the same node via the middleware service, and process data information subscribed by a control services may be configured to be copied by the control service from a middleware service interface, which in turn is configure to receive the process data information from the network centric process control system via the middleware service and/or from another control service executing in the same node via the middleware service. The process data information may be configured to be copied cyclically prior to each execution of control logic or IO channel scanning.

The middleware service interface may be configured to handle signal quality by overriding or substituting values in case of bad quality.

The middleware service interface may be configured to group publishing process data information in data sets, wherein each data set is assigned a multicast address.

According to a third aspect there is presented a computer program for process control in a network centric process control system. The network centric process control system comprises a plurality of nodes, wherein each node is configured to run one or more control services being a separate executable running in a separate operating system process provided by a real time operating system thereof, wherein configuration data defining a communication interface for process data between the plurality of nodes are configured to be received from an engineering node of the network centric process control system. The computer program comprises computer program code, which when run in network centric process control system, causes the network centric process control system to publish process data information in the network centric process control system via a middleware service, the process data information comprising an identity unique in the network centric process control system, a data type for process data, and process data, wherein the middleware service is caused to be a separate executable running in a separate operating system process provided by a real time operating system thereof, and to subscribe to process data information published in the network centric process control system via the middleware service.

The publishing and the subscribing may be bound by multicast addresses.

A computer program product comprising a computer program and a computer readable storage means on which the computer program is stored is also presented.

The presented solution enables flexible deployment of control logic to nodes and isolates control logic engineering from IO engineering. Control logic can be completely engineered without knowing where the control logic will be executed, or how/where the IO and devices are connected. Changes in the plant to IO wiring does not affect the control logic. Control logic may also easily be moved (without reengineering) to nodes with spare resources.

The presented solution is enabled since signals are used as an interface between the control logic and the IO and device handling, which makes it possible to separate the IO and device handling from the execution of control logic into different control services. Signals are defined in a standardized format, independent of device and fieldbus protocol specific details. All controllers, gateways and devices have a middleware component, which makes it possible for any control service to access any signal in any other control service without knowledge of network layout, control service deployment, or control service internals. The engineering tools for control logic and IO engineering have a middleware configuration component that creates a consolidated middleware configuration. The middleware binding mechanism makes it possible to move a signal publisher from one node to another without affecting the subscribers, and vice versa.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The processing blocks of any method disclosed herein do not have to be performed in the exact order disclosed, unless explicitly stated.

BRIEF DESCRIPTION OF THE DRAWINGS

Aspects and embodiments are now described, by way of example, with reference to the accompanying drawings, in which.

DETAILED DESCRIPTION

The aspects of the present disclosure will now be described more fully hereinafter with reference to the accompanying drawings, in which certain embodiments of the invention are shown.

These aspects may, however, be embodied in many different forms and should not be construed as limiting; rather, these embodiments are provided by way of example so that this disclosure will be thorough and complete, and to fully convey the scope of all aspects of invention to those skilled in the art. Like numbers refer to like elements throughout the description.

Figure 1:
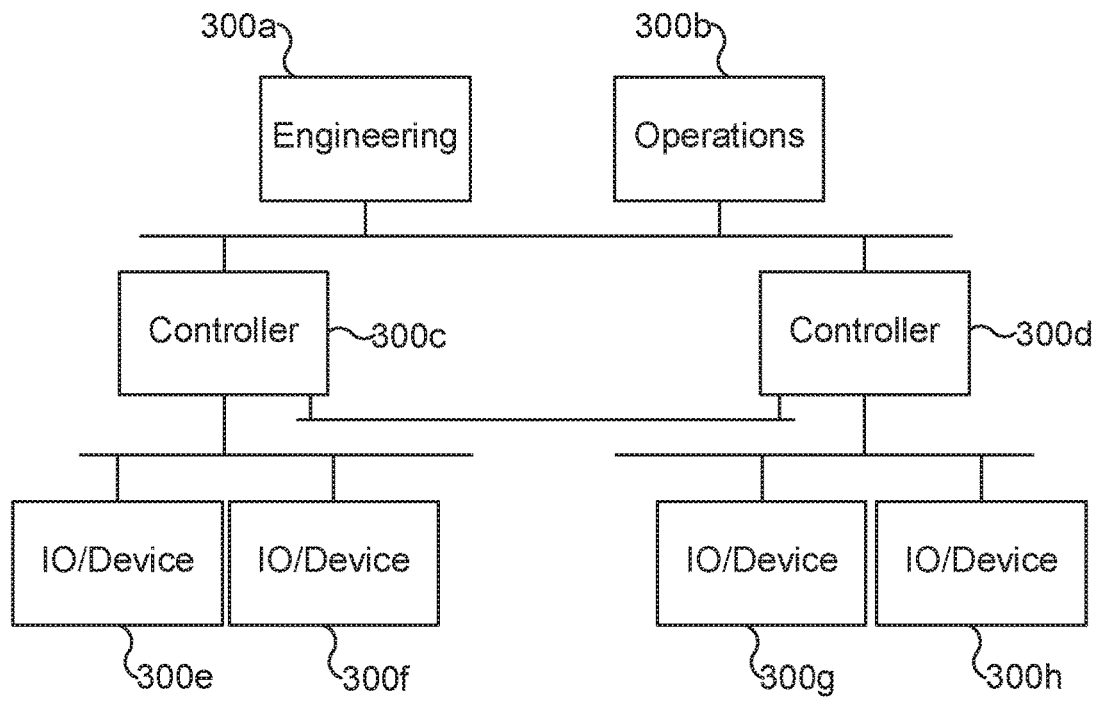
FIG. 1 schematically illustrates a controller centric process control system architecture.
Figure 2:
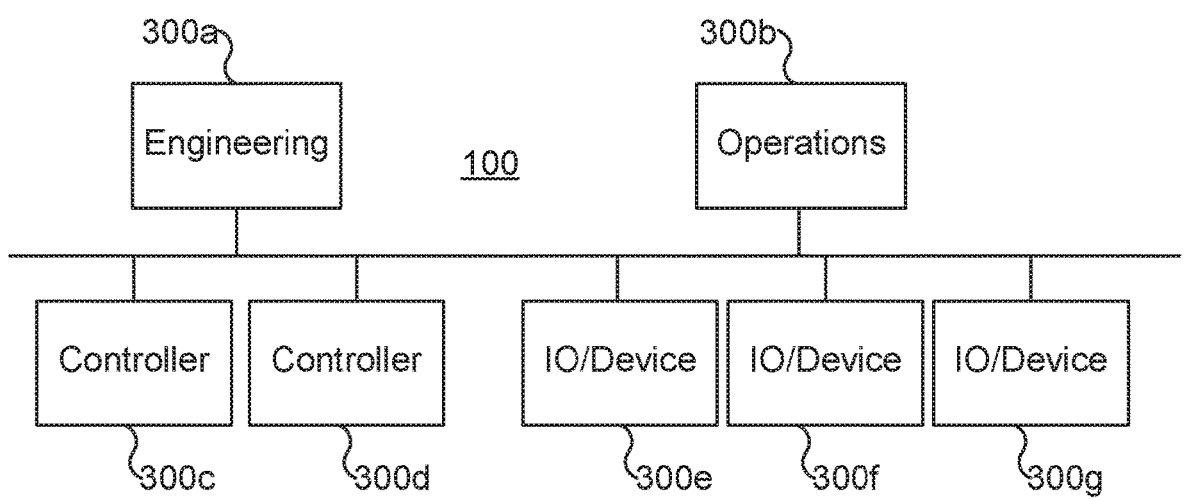
FIG. 2 schematically illustrates a network centric process control system architecture.

In a network centric process control system 100 architecture, as illustrated in FIG. 2 in a logical topology, IOs and devices 300e, 300f, and 300g are not owned or controlled by controllers 300c and 300d, as in a controller centric architecture. The engineering 300a tool for IO and device configuration deploys configuration data to the IO and devices without involving a controller 300c or 300d. Controllers 300c and 300d are focused on execution of control logic and can access IO signals from any IO or device 300e, 300f, or 300g. The network centric process control system architecture provides a system-wide easy access to IO and device information from upper system levels, such as operations 300b and engineering 300a, without any routing of information through the controller 300c or 300d. The control logic doesn't have to be updated to access IO and device information.

Figure 3:
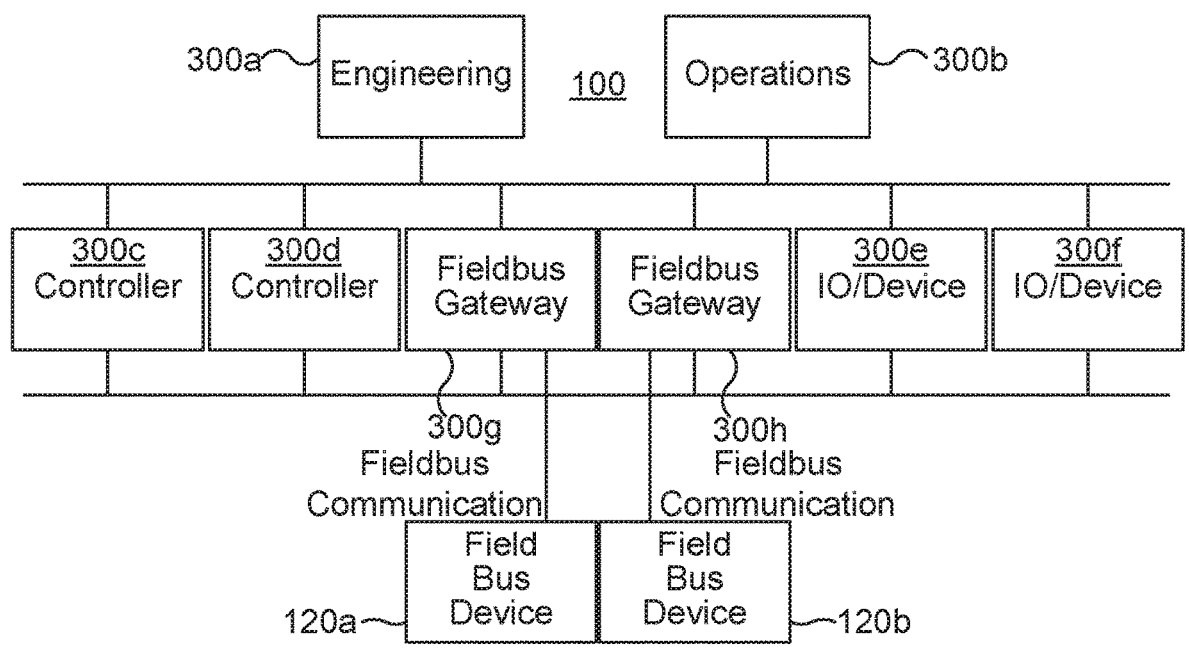
FIG. 3 schematically illustrates a network centric process control system architecture with fieldbus gateways.

However, most IOs and devices of today, and for several years to come, are connected through a fieldbus protocol. Therefore, a gateway 300g or 300h that connects the IO and field devices 120a and 120b to the network centric communication system 100 architecture is needed, which is illustrated in FIG. 3 in a logical topology. These gateways 300g and 300h handle configuration and scanning of the IOs and devices 120a and 120b on the field bus.

Figure 4:
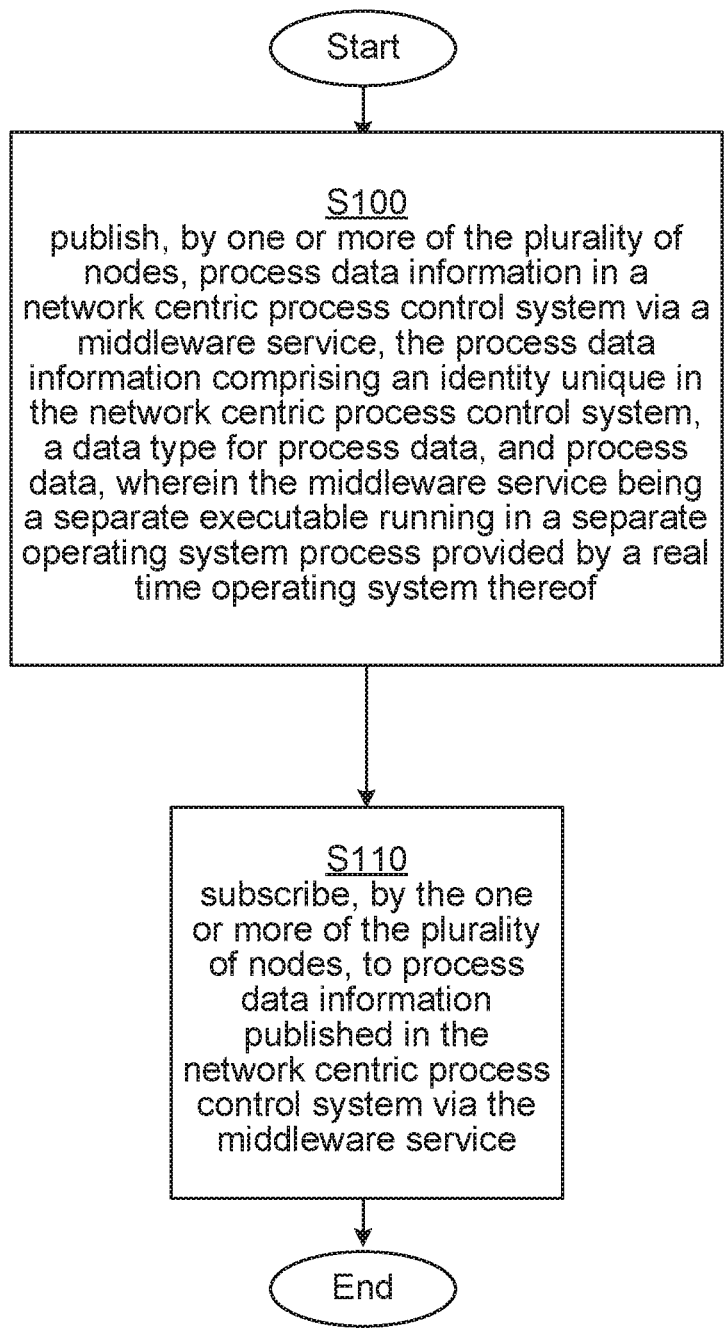
FIG. 4 is a flow chart illustrating a method for embodiments presented herein.

An embodiment of a method for process control in a network centric process control system is presented with reference to FIG. 4. The network centric process control system 100 comprises a plurality of nodes 300b. Each node comprises one or more control services 310b being a separate executable running in a separate operating system process provided by a real time operating system thereof. Configuration data defining a communication interface for process data between the plurality of nodes has been received from an engineering node. In processing block S100 one or more of the plurality of nodes publishes process data information in the network centric process control system via a middleware service 320b, as further described below and in greater detail in conjunction with the below figures. The process data information comprises an identity unique in the network centric process control system, a data type for process data, and process data. The middleware service is a separate executable running in a separate operating system process provided by a real time operating system thereof. In processing block S110 the one or more of the plurality of nodes subscribes to process data information published in the network centric process control system via the middleware service, as further described below and in greater detail in conjunction with the below figures. The publishing and the subscribing may be bound by multicast addresses.

The plurality of nodes may comprise one or more of a device node, a fieldbus gateway node and a controller node.

Process data information to be published by a control services may be copied by the control service to a middleware service interface, which in turn publishes the process data information in the network centric process control system via the middleware service and/or to another control service executing in the same node via the middleware service.

Process data information subscribed by a control service may be copied by the control service from a middleware service interface, which in turn has received the process data information from the network centric process control system via the middleware service and/or from another control service executing in the same node via the middleware service. The process data information may be copied cyclically prior to each execution of control logic or IO channel scanning.

The middleware service interface may handle signal quality by overriding or substituting values in case of bad quality.

The middleware service interface may be configured to group publishing process data information in data sets, wherein each data set is assigned a multicast address.

The operations shown in FIG. 4 will now be illustrated and described in more detail in conjunction with FIGS. 5-11.

Figure 5:
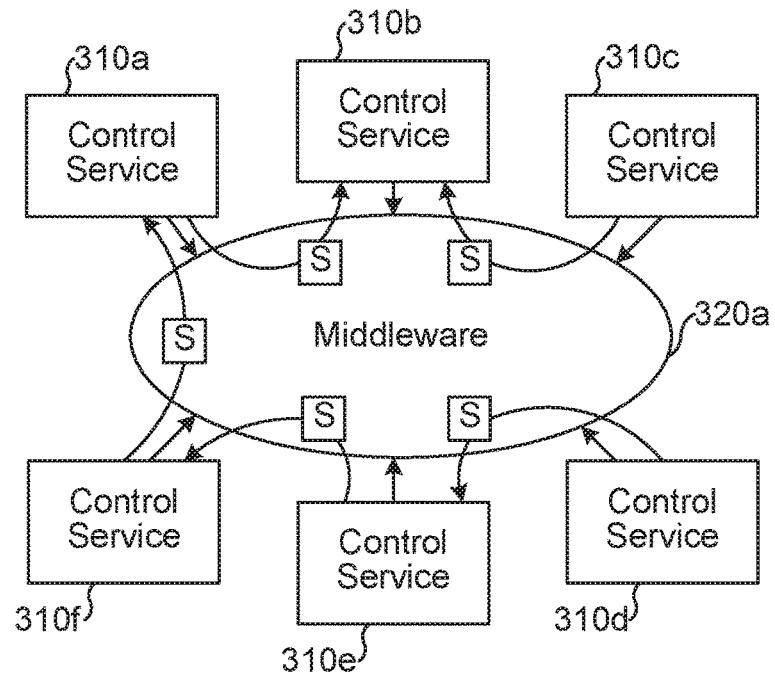
FIG. 5 schematically illustrates a embodiment of a middleware service for signal exchange.

A middleware service 320a for a network centric process control system architecture is presented with reference to FIG. 5. The middleware service 320a handles exchange of process data, represented as signals S, between control services 310a, 310b, 310c, 310d, 310e, and 310f in different nodes within the system, or within a node with multiple control services. The control services represent the principal services in controllers, gateways and devices, e.g. execution of control logic in a controller, scanning of IO and field devices in a fieldbus gateway, managing device functionality in a device. The arrows for the signals S represent data flow. Each control service is dependent on the middleware service 320a, which is illustrated with arrows there between.

Control services are typically allocated in different nodes, with one or multiple control services per node.

Figure 6:
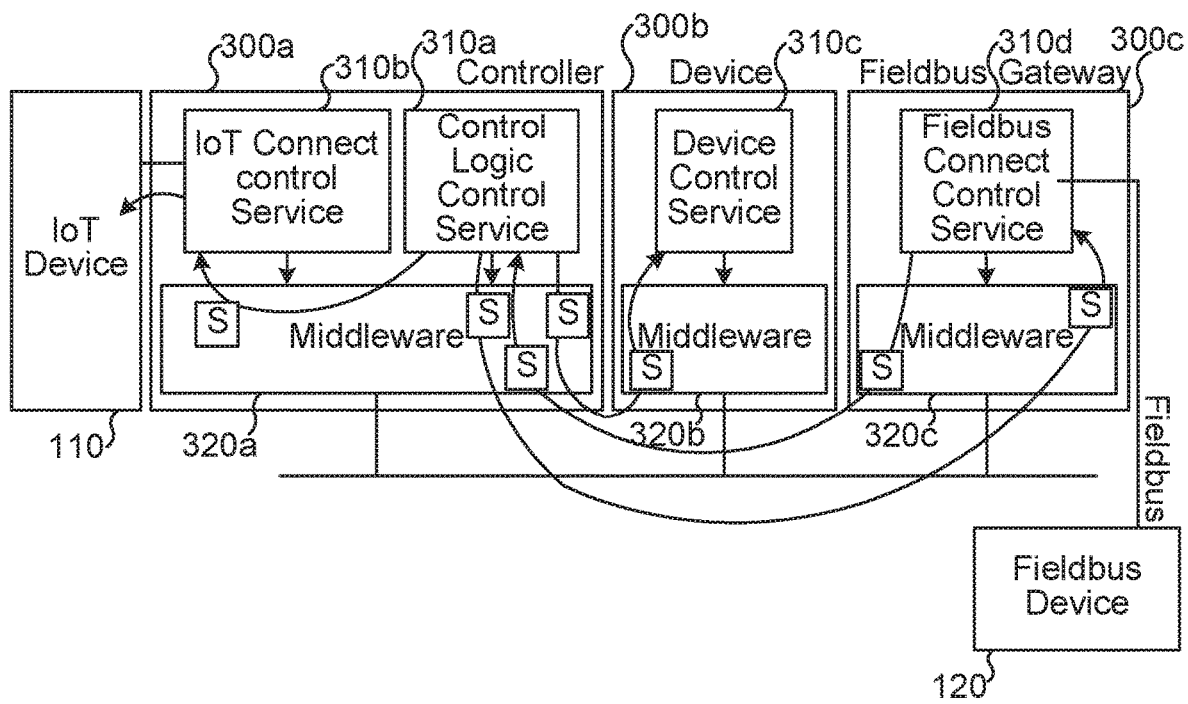
FIG. 6 schematically illustrates control services allocated to different nodes.

A control service 310a has thus no knowledge about where other control services 310b, 310c, and 310d that the control service 310a interacts with are allocated, which is instead handled by the middleware service 320a and is transparent to the control service 310a. FIG. 6 shows an example with four control services 310a, 310b, 310c, and 310d executing in three nodes, a device node 300b, a fieldbus gateway node 300c and a controller node 300a, which controller node 300a hosts two control services 310a and 310b. All three nodes have a middleware service 320a, 320b, and 320c, respectively, that handles the signal S exchange between the control services in the different nodes as well as between control services 310a and 310b allocated in the same node. The data flows are illustrated with arrows with signal S. The control service 310a dependency on the middleware services 320a is illustrated with arrows without S.

Interactions with controllers, devices etc. not using the middleware as presented herein, can be handled by control services specific for a communication protocol needed for the interaction, as illustrated in FIG. 6. An IoT Connect control service 310b connects to IoT devices 110 and a Fieldbus Connect control service 310d connects to fieldbus devices 120, e.g. Profibus devices. Such control services can execute in any node, e.g. in the controller node 300a, as the IoT Connect control service 310b, or in a separate node 300c, as the Fieldbus Connect control service 310d.

Middleware services as well as control services are built as separate executables, running in separate operating system processes, for memory protection and isolation of faults. A control service interacts with middleware services through inter process communication. The same processor and memory may be used, but the executables are still run in separated processes. Separate processor cores and/or memories may alternatively be used for the separate processes. That is, a node is configured with separate executables to perform process block S100.

Figure 7:
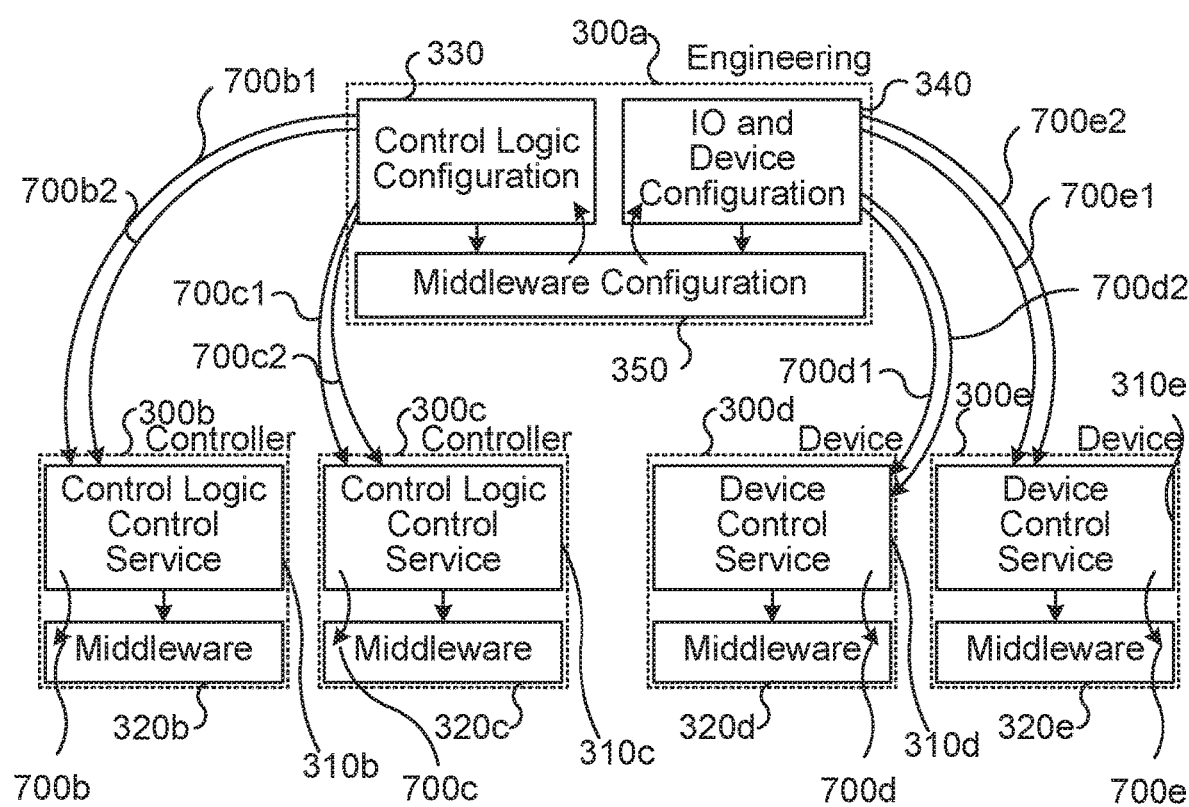
FIG. 7 schematically illustrates configuration of control services and middleware service.

Control services are configured by a set of engineering 300a tools, one tool for each control service type, e.g. one engineering tool for control logic configuration 330 and another tool for IO and device configuration 340, as illustrated in FIG. 7. This gives an isolation of e.g. control logic engineering from IO engineering. Control logic can thus be completely engineered without knowing where the control logic will be executed, or how/where the IO and devices are connected.

The middleware services are configured by a middleware configuration component 350, which uses signal definitions provided by the tools to create the middleware configuration. The middleware configuration is sent with the control service configuration and forwarded to middleware services 320b, 320c, 320d, and 320e as shown symbolically by arrows 700b, 700c, 700d, and 700e by the control services 310b, 310c, 310d, and 310e, in nodes 300b, 300c, 300d, and 300e, respectively, as shown symbolically by arrows 700b1, 700b2, 700c1, 700c2, 700d1, 700c2, 700e1, and 700e2.

A signal defines an interface between a publisher and a subscriber for process data to be exchanged. A signal may contain the following attributes:
  system unique signal ID,
  data type for the signal value, such as Boolean for digital signals or float for analogue signals,
  ranges (or intervals) and engineering units for the signal value (only used for analogue signals),
  override value, used by the signal subscriber in case of bad signal quality, e.g. if the subscriber did not get any signals from the publisher, e.g. due to network error, and
  substitute value, used by the signal publisher in case of bad signal quality, e.g. if an IO scanner has detected an error on an input channel on a fieldbus device. That is, a node is configured with process data information to perform process block S100.

The signals are, in the engineering tools, configured and connected to control logic variables and IO channels, for control logic and IO engineering, respectively. The configuration is then downloaded to the nodes 300b-300e, which is illustrated with parallel arrows for the control service configuration data flow and the middleware configuration data flow, respectively. Dependency between control services 310b-310e and corresponding middleware services 320b-320e are illustrated with straight arrows. The engineering 300a tools use the middleware configuration component 350 to ensure that the signal IDs are unique within the system, e.g. by having engineering tools to register signals therein and get signal IDs from middleware configuration.

Figure 8:
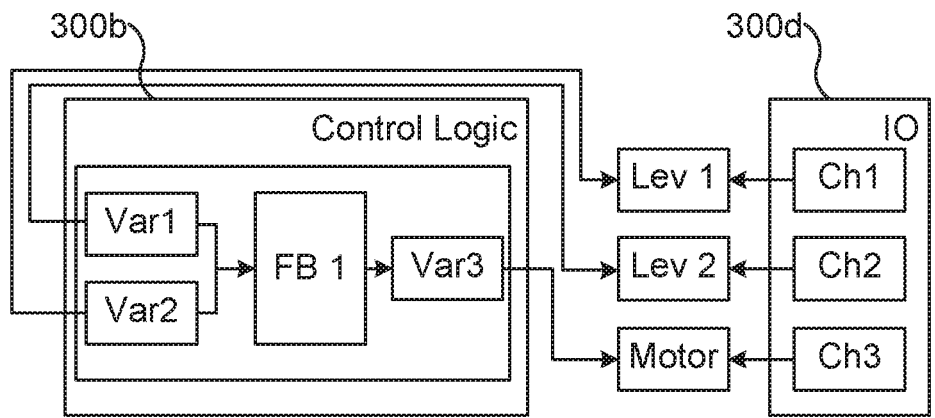
FIG. 8 schematically illustrates a signal example in an engineering view.

FIG. 8 shows an example where three signals Lev 1, Lev 2 and Motor are used to connect three IO 300d channels Ch1, Ch2 and Ch3 to a simple control logic 300b. The control logic uses variables Var1 and Var2 in a function block FB 1 to get variable Var 3. The level signal Lev 1 is connected to the control logic variable Var2 and to the IO channel Ch1. The Lev 2 signal and the Motor signal are used in a similar way to connect control logic variables to IO channels. The signal connections are illustrated by arrows.

Figure 9:
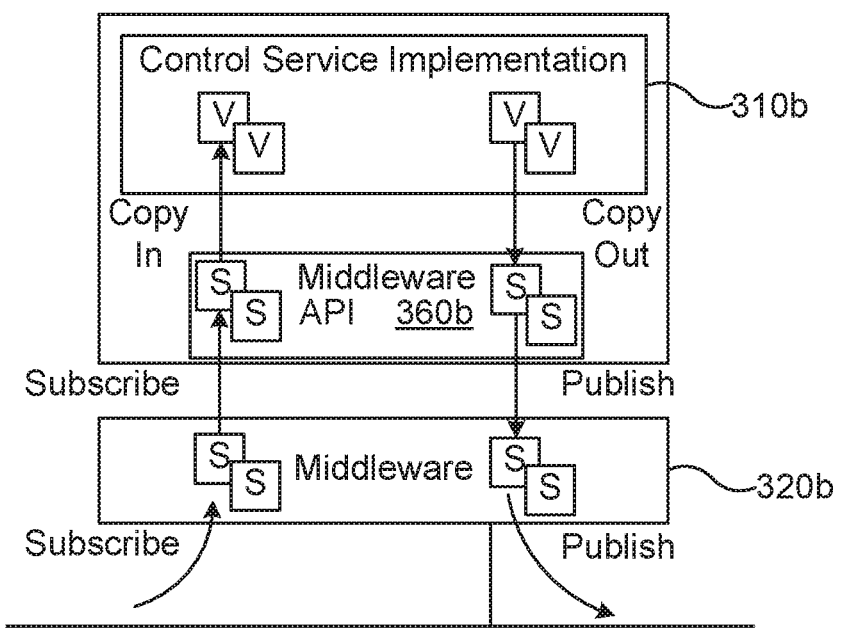
FIG. 9 schematically illustrates a control service using a middleware service.

FIG. 9 illustrates how a middleware service 320b is used by a control service 310. The control service implementation represents the implementation of e.g. an execution engine (to execute control logic: subscribe, execute, publish) or an IO scanner (as communication protocol for IO: read In signal, execute, provide Out signal). To simplify the implementation of a control service 310b, the middleware 320b provides an Application Programmer Interface (API) component, middleware API 360b, which is used by the control service implementation 310b for interactions with the middleware service 320b. The middleware API 360b handles the signal quality, e.g. applying an override or substitute value in case of bad quality, handles force of signals and signal timestamps. The middleware API 360b also handles the inter process communication between the control service 310b and the middleware service 320b. The middleware service 320b handles the exchange of signals S between control services 310b, including configuration of the signal exchange, using a communication protocol as described below, i.e. for horizontal communication in the network centric process control system.

During configuration of a control service 310b, the middleware service 320b receives configuration information for the signals S that the control service 310b shall subscribe to, and for the signals S the control service 310b shall publish. The configuration is received from the middleware configuration component 350 in engineering as illustrated in FIG. 7. The middleware service 320b uses this configuration data for its internal needs, e.g. for creation of signals and other structures needed to send and receive messages on the network, and to subscribe to signals on the network.

Similarly, as illustrated in FIG. 7, the control service implementation 310b receives configuration information about how signals S shall be connected to its internal variables V, typically control logic variables or IO channels from its configuration tool in engineering 300a.

In runtime, signals produced by a control service 310b are copied from internal variables/channels V to signals S in the middleware API 360b, which publishes the signals in the middleware service 320b, which publishes the signals on the network, and/or makes the signals available to any other control service executing in the same node. The signal publishing is made cyclically, e.g. after each execution of the control logic or IO scanning.

In nodes that have subscribed to the published signals S, the middleware service 320b receives the subscribed signals S from the network and makes them available for the middleware API 360b in the control service 310b that has subscribed to the signals S. The control service implementation 310b copies the signal values to the control service internal variables/channels V. The copy is made cyclically, prior to each execution of the control logic or IO scanning.

The copying of signal values also includes any transformation between an internal variable/channel data format and the uniform signal data format, scaling between instrument range for an analogue IO channel and engineering range for a signal.

Figure 10:
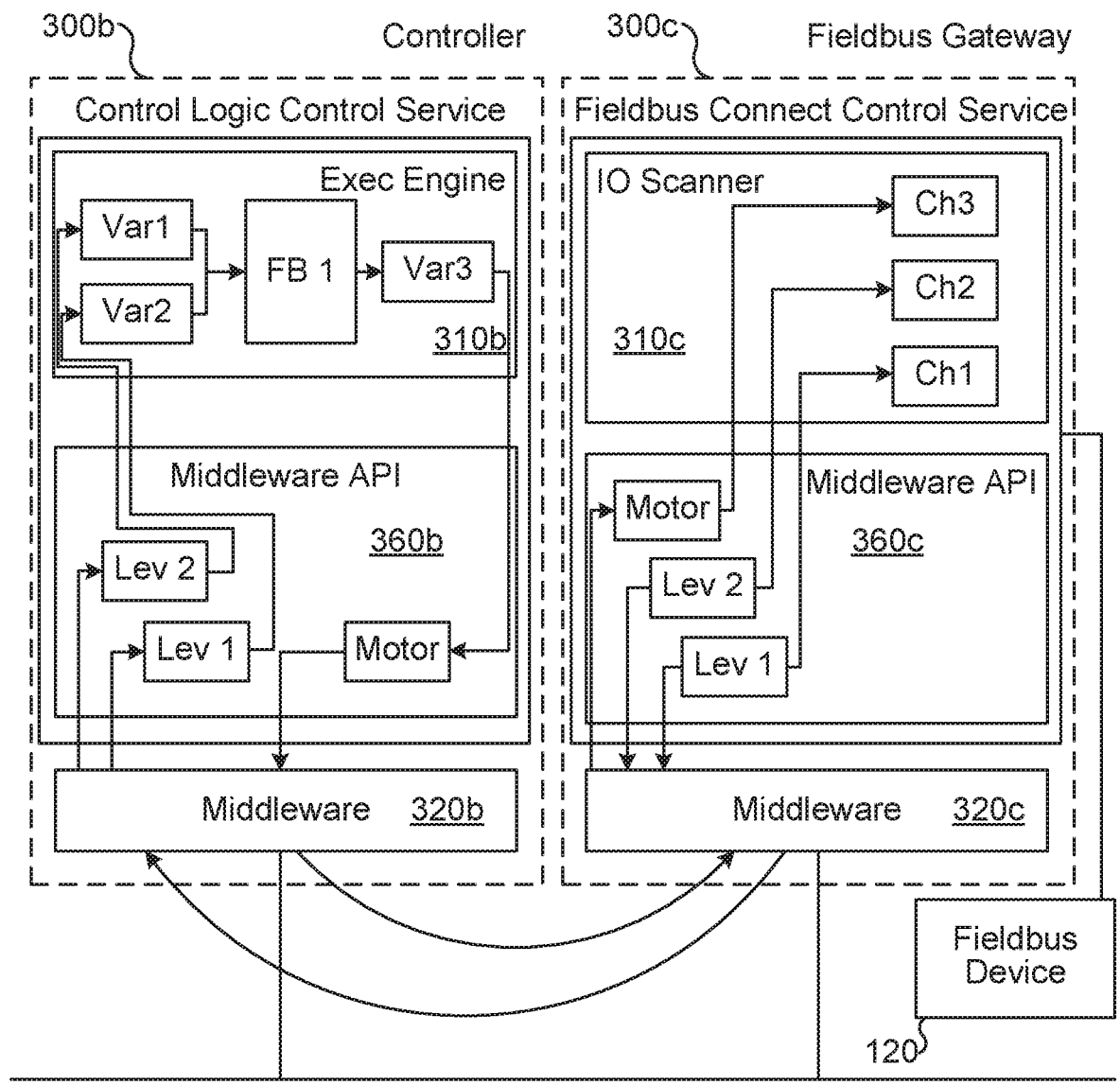
FIG. 10 schematically illustrates a signal example in a runtime view.

FIG. 10 illustrates the middleware runtime behavior for the signal example in FIG. 8. The IO scanner, in the fieldbus connect control service 310c, subscribes to the signal that is connected to the output channel (i.e. the Motor signal) and publishes the two signals connected to the input channels (Lev 1 and Lev 2). The IO scanner makes conversions between device and fieldbus specific formats and the signal format, and scales analogue values between instrument range and engineering range. The execution engine, in the control logic control service 310b, subscribes to signals (Lev 1 and Lev 2) connected to the control logic input variables (Var1 and Var2), and publishes the signal (Motor) connected to the control logic output variable (Var3). The execution engine makes conversions between signal formats and control logic variable formats. FIG. 10 additionally illustrates middleware 320b and 320c, and middleware API 360b and 360c with corresponding function as described in connection with FIG. 9.

To reduce the number of messages sent on the network, the middleware configuration component in engineering may group signals or tasks to be published in data sets. Each data set is assigned to a multicast address, e.g. IPV4 or IPV6. The data set information is part of the configuration data downloaded to middleware as described above.

Binding of signal subscribers and signal publishers may be based on the Open Platform Communications Unified Architecture (OPC UA) standard of the OPC foundation, OPC UA PubSub with dynamic multicast filtering in the network and publish/subscribe to multicast addresses. The middleware subscribes to data set multicast addresses on the network, and when the middleware service publishes a data set on one of these multicast addresses, the dynamic multicast filtering in the network ensures that this data set is distributed only to the nodes that have subscribed to this multicast address, e.g. by switches.

Figure 11:
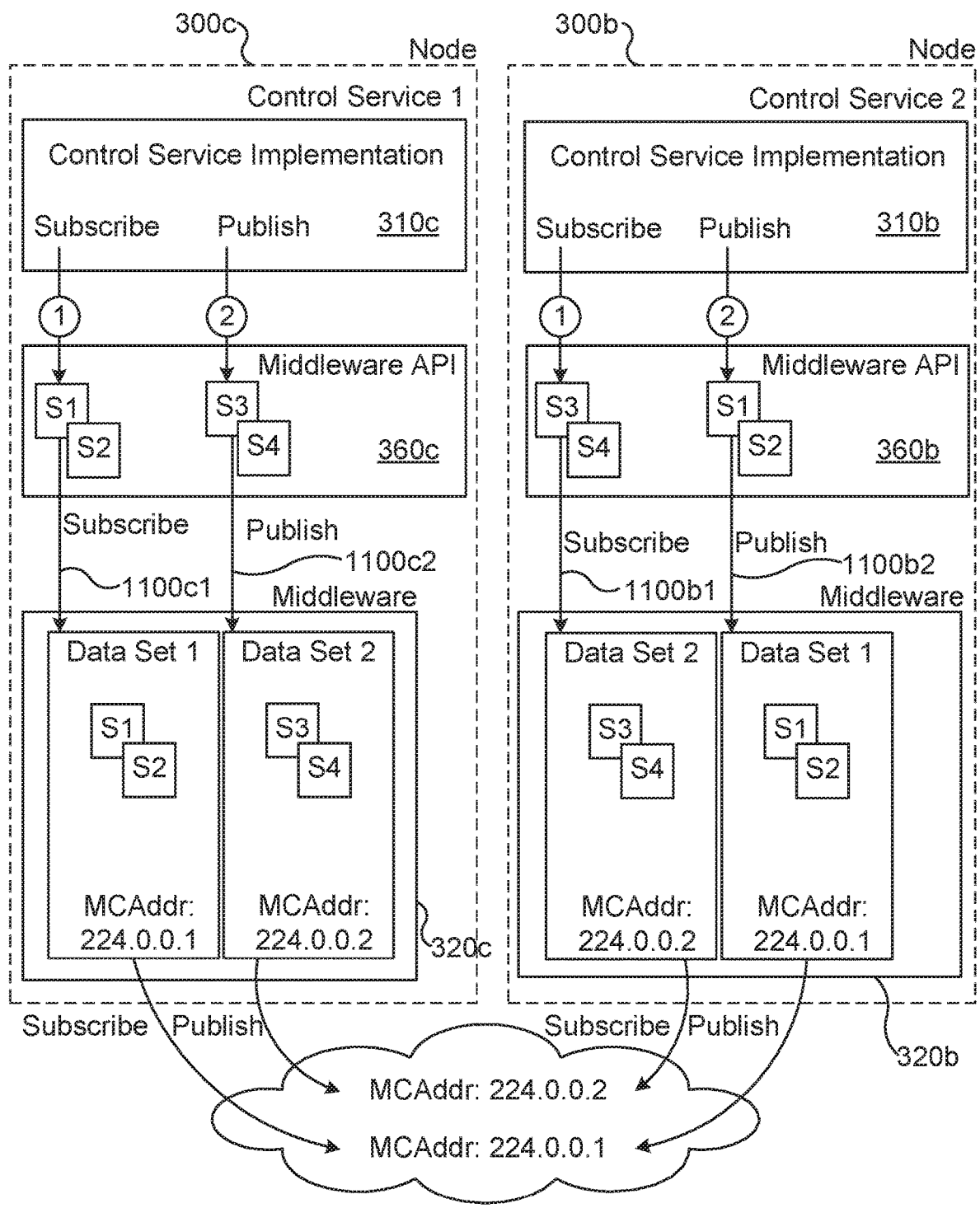
FIG. 11 schematically illustrates binding of signal subscribers and signal publishers.

FIG. 11 shows an example with two interacting control services 310b and 310c running in two different nodes 300b and 310c, respectively. During the control service configuration, the control service implementation 310c subscribes 1 to signals S1 and S2 using the middleware API 360c, which forwards the subscription the middleware service 320c as shown symbolically by arrow 1100c1, which subscribes to the data set 1 multicast addresses (MCAddr) 224.0.0.1 on the network. Correspondingly, the control service implementation 310b subscribes 1 to signals S3 and S4 using the middleware API 360b, which forwards the subscription to the middleware service 320b as shown symbolically by arrow 1100b1, which subscribes to the data set 2 multicast addresses (MCAddr) 224.0.0.2 on the network. After the configuration, the control service implementation 310c starts to publish 2 signals S3 and S4 using the middleware API 360c, which publishes the signals in the middleware service 320c as shown symbolically by arrow 1100c2, which publishes the data set 2 using the data set multicast addresses 224.0.0.2. Correspondingly, the control services implementation 310b starts to publish 2 signals S1 and S2 using the middleware API 360b, which forwards the publishing to the middleware service 320b as shown symbolically by arrow 1100b2, which publishes the signals in the middleware service 320b which publishes the data set 1 using the data set multicast addresses 224.0.0.1. That is, a node is configured to publish process data to perform process block S100, and also configured to subscribe to process data to perform process block S110.

The binding of publisher and subscriber executing in the same node is similar, however without involving the network. The binding is made in the middleware service in that node. From a control service point of view there are no differences between the two types of control service deployments.

Other protocols and mechanisms than OPC UA PubSub with dynamic multicast filtering may be used for the binding of publishers and subscribers, e.g. OPC UA client/server with additional discovery services.

Figure 12:
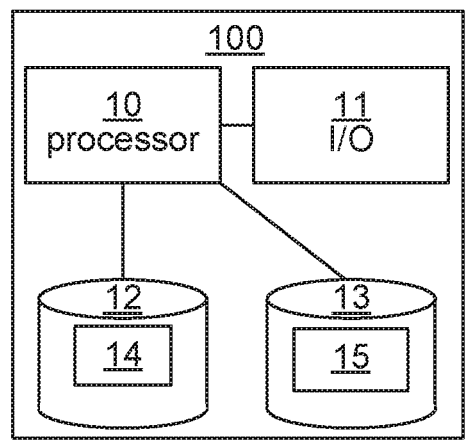
FIG. 12 is a schematic diagram illustrating some components of devices presented herein.

An embodiment of a network centric process control system is presented with reference to FIG. 12. The network centric process control system 100 comprises a plurality of nodes 300b, wherein each node is configured to run one or more control services 310b being a separate executable running in a separate operating system process provided by a real time operating system thereof, wherein configuration data defining a communication interface for process data between the plurality of nodes are configured to be received from an engineering node of the network centric process control system. The network centric process control system comprises a processor 10 and a computer program product 12, 13 storing instructions that, when executed by the processor, causes the network centric process control system to publish process data information in the network centric process control system via a middleware service 320b, the process data information comprising an identity unique in the network centric process control system, a data type for process data, and process data, wherein the middleware service is configured to be a separate executable running in a separate operating system process provided by a real time operating system thereof, and to subscribe to process data information published in the network centric process control system via the middleware service, wherein the publishing and the subscribing may be bound by multicast addresses.

The plurality of nodes may comprise one or more of a device node, a fieldbus gateway node and a controller node.

Process data information to be published by a control services may be configured to be copied by the control service to a middleware service interface, which in turn is configured to publish the process data information in the network centric process control system via the middleware service and/or to another control service executing in the same node via the middleware service.

Process data information subscribed by a control services may be configured to be copied by the control service from a middleware service interface, which in turn is configured to receive the process data information from the network centric process control system via the middleware service and/or from another control service executing in the same node via the middleware service. The process data information may be configured to be copied cyclically prior to each execution of control logic or IO channel scanning.

The middleware service interface may be configured to handle signal quality by overriding or substituting values in case of bad quality.

The middleware service interface may be configured to group publishing process data information in data sets, wherein each data set is assigned a multicast address.

FIG. 12 is a schematic diagram showing some components of the network centric process control system 100. The processor or processing circuitry 10 may be provided using any combination of one or more of a suitable central processing unit (CPU), multiprocessing circuitry, microcontroller, digital signal processing circuitry (DSP), application specific integrated circuit etc., capable of executing software instructions of a computer program 14 stored in a memory. The memory can thus be considered to be or form part of the computer program product 12. The processing circuitry 10 may be configured to execute methods described herein with reference to FIG. 4.

The memory may be any combination of read and write memory (RAM), and read only memory (ROM). The memory may also comprise persistent storage, which, for example, can be any single one or combination of magnetic memory, optical memory, solid state memory or even remotely mounted memory.

A second computer program product 13 in the form of a data memory may also be provided, e.g. for reading and/or storing data during execution of software instructions in the processing circuitry 10. The data memory can be any combination of read and write memory (RAM), and read only memory (ROM), and may also comprise persistent storage, which, for example, can be any single one or combination of magnetic memory, optical memory, solid state memory or even remotely mounted memory. The data memory may e.g. hold other software instructions 15, to improve functionality for the network centric process control system.

The network centric process control system may further comprise an input/output (I/O) interface 11 including e.g. a user interface. The network centric process control system may further comprise a receiver configured to receive signaling from other nodes, and a transmitter configured to transmit signaling to other nodes (not illustrated). Other components of the network centric process control system are omitted in order not to obscure the concepts presented herein.

An embodiment of a computer program for process control in a network centric process control system is presented with reference to FIG. 12. The network centric process control system 100 comprises a plurality of nodes 300b, wherein each node is configured to run one or more control services 310b being a separate executable running in a separate operating system process provided by a real time operating system thereof, wherein configuration data defining a communication interface for process data between the plurality of nodes are configured to be received from an engineering node of the network centric process control system, the computer program comprising computer program code, which when run in network centric process control system, causes the network centric process control system to publish S100 process data information in the network centric process control system via a middleware service 320b, the process data information comprising an identity unique in the network centric process control system, a data type for process data, and process data, wherein the middleware service is caused to be a separate executable running in a separate operating system process provided by a real time operating system thereof, and to subscribe S110 to process data information published in the network centric process control system via the middleware service, wherein the publishing and the subscribing may be bound by multicast addresses.

The plurality of nodes may comprise one or more of a device node, a fieldbus gateway node and a controller node.

A computer program product 12, 13, comprising a computer program 14, 15 and a computer readable storage means on which the computer program 14, 15 is stored is also presented.

Figure 13:
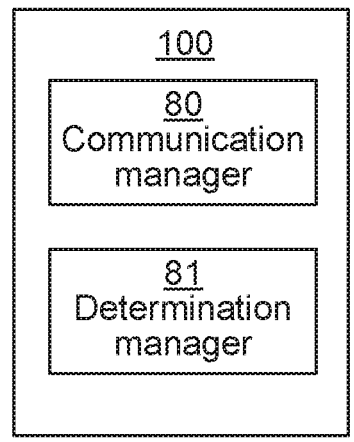
FIG. 13 is a schematic diagram illustrating functional modules of devices presented herein.

A network centric process control system for process control is presented with reference to FIG. 13. The network centric process control system 100 comprises a communication manager 80 for publishing S100, by one or more of a plurality of nodes 300b, process data information in the network centric process control system via a middleware service 320b, the process data information comprising an identity unique in the network centric process control system, a data type for process data, and process data, wherein the middleware service being a separate executable running in a separate operating system process provided by a real time operating system thereof, and for subscribing S110, by the one or more of the plurality of nodes, to process data information published in the network centric process control system via the middleware service, wherein the publishing and the subscribing may be bound by multicast addresses.

The plurality of nodes may comprise one or more of a device node, a fieldbus gateway node and a controller node.

FIG. 13 is a schematic diagram showing functional blocks of the network centric process control system 100. The modules may be implemented as only software instructions such as a computer program executing in a cache server or only hardware, such as application specific integrated circuits, field programmable gate arrays, discrete logical components, transceivers, etc. or as a combination thereof. In an alternative embodiment, some of the functional blocks may be implemented by software and other by hardware. The modules correspond to the processing blocks in the method illustrated in FIG. 4, comprising a communication manager unit 80 and a determination manager unit 81. In the embodiments where one or more of the modules are implemented by a computer program, it shall be understood that these modules do not necessarily correspond to process modules, but can be written as instructions according to a programming language in which they would be implemented, since some programming languages do not typically contain process modules.

The communication manager 80 is for process control in the network centric process control system. This module corresponds to the processing blocks S100 and S110 of FIG. 4. This module can e.g. be implemented by the processing circuitry 10 of FIG. 12, when running the computer program.

The determination manager 81 may be used for additional process control in the network centric process control system. This module can e.g. be implemented by the processing circuitry 10 of FIG. 12, when running the computer program.

The aspects of the present disclosure have mainly been described above with reference to a few embodiments and examples thereof. However, as is readily appreciated by a person skilled in the art, other embodiments than the ones disclosed above are equally possible within the scope of the invention, as defined by the appended patent claims.

The invention claimed is:

1. A method for process control in a network centric process control system, the network centric process control system comprising a plurality of nodes, wherein each node includes one or more control service being a separate executable running in a separate operating system process provided by a real time operating system thereof, wherein the plurality of nodes have received configuration data from an engineering node of the network centric process control system, wherein the configuration data defines a communication interface for exchanging process data between the plurality of nodes, the method comprising the steps:

publishing, by one or more of the plurality of nodes, process data information in the network centric process control system via a middleware service of said one or more of the plurality of nodes, wherein the publishing is made by one control service of said one or more of the plurality of nodes, wherein the process data information includes process data, a data type for the process data, and an identity unique in the network centric process control system, wherein the middleware service is a separate executable running in a separate operating system process provided by a real time operating system thereof, wherein a middleware service interface provided by the middleware service is configured to group publishing process data information in data sets, wherein each data set comprises signals and is assigned a multicast address; and subscribing, by the one or more of the plurality of nodes, to the process data information published in the network centric process control system via the middleware service, wherein the subscribing is made by another control service of said one or more of the plurality of nodes.

2. The method according to claim 1, wherein the publishing and the subscribing are bound by multicast addresses.

3. The method according to claim 2, wherein the middleware service interface handles signal quality by overriding or substituting values in case of bad quality.

4. The method according to claim 2, wherein process data information to be published by said one control service is copied by said one control service to a middleware service interface, which in turn publishes the process data information in the network centric process control system via the middleware service and/or to said another control service via the middleware service if said another control service is executing in the same node, and wherein process data information subscribed by said another control service is copied by said another control service from a middleware service interface, which in turn has received the process data information from the network centric process control system via the middleware service and/or from said one control service via the middleware service if said one control service is executing in the same node.

5. The method according to claim 1, wherein process data information to be published by said one control service is copied by said one control service to a middleware service interface, which in turn publishes the process data information in the network centric process control system via the middleware service and/or to said another control service via the middleware service if said another control service is executing in the same node, and wherein process data information subscribed by said another control service is copied by said another control service from a middleware service interface, which in turn has received the process data information from the network centric process control system via the middleware service and/or from said one control service via the middleware service if said one control service is executing in the same node.

6. The method according to claim 5, wherein the process data information is copied cyclically prior to each execution of control logic or 10 channel scanning.

7. The method according to claim 5, wherein the middleware service interface handles signal quality by overriding or substituting values in case of bad quality.

8. A network centric process control system comprising:
a plurality of nodes, wherein each node is configured to run one or more control services being a separate executable running in a separate operating system process provided by a real time operating system thereof, wherein the plurality of nodes are configured to receive configuration data from an engineering node of the network centric process control system, wherein the configuration data defines a communication interface for exchanging process data between the plurality of nodes,
a processor; and
a computer program product storing instructions that, when executed by the processor, causes the network centric process control system to:
publish process data information in the network centric process control system via a middleware service of one or more of the plurality of nodes, wherein the publishing is made by one control service of said one or more of the plurality of nodes, wherein the process data information includes process data, a data type for the process data, and an identity unique in the network centric process control system, wherein the middleware service is configured to be a separate executable running in a separate operating system process provided by a real time operating system thereof, wherein a middleware service interface provided by the middleware service is configured to group publishing process data information in data sets, wherein each data set comprises signals and is assigned a multicast address; and
subscribe to the process data information published in the network centric process control system via the middleware service, wherein the subscribing is made by another control service of said one or more of the plurality of nodes.

9. The network centric process control system according to claim 8, wherein the publishing and the subscribing are bound by multicast addresses.

10. The network centric process control system according to claim 9, wherein the middleware service interface is configured to handle signal quality by overriding or substituting values in case of bad quality.

11. The network centric process control system according to claim 8, wherein process data information to be published by said one control service is configured to be copied by said one control service to a middleware service interface, which in turn is configured to publish the process data information in the network centric process control system via the middleware service and/or to said another control service via the middleware service if said another control service is executing in the same node, and
wherein process data information subscribed by said another control service is configured to be copied by the control service from a middleware service interface, which in turn is configured to receive the process data information from the network centric process control system via the middleware service and/or from said one control service via the middleware service if said one control service is executing in the same node.

12. The network centric process control system according to claim 11, wherein the process data information is configured to be copied cyclically prior to each execution of control logic or 10 channel scanning.

13. The network centric process control system according to claim 11, wherein the middleware service interface is configured to handle signal quality by overriding or substituting values in case of bad quality.

14. A computer program product for process control in a network centric process control system having a plurality of nodes, wherein each node is configured to run one or more control services being a separate executable running in a separate operating system process provided by a real time operating system thereof, wherein the plurality of nodes are configured to receive configuration data from an engineering node of the network centric process control system, wherein the configuration data defines a communication interface for exchanging process data between the plurality of nodes, the computer program product comprising:
a non-transitory computer-readable storage medium; and
a computer program code stored on the non-transitory computer-readable medium and being configured to, when run in the network centric process control system, cause the network centric process control system to:
publish process data information in the network centric process control system via a middleware service of one or more of the plurality of nodes, wherein the publishing is made by one control service of said one or more of the plurality of nodes, wherein the process data information includes process data, a data type for the process data, and an identity unique in the network centric process control system, wherein the middleware service is caused to be a separate executable running in a separate operating system process provided by a real time operating system thereof, wherein a middleware service interface provided by the middleware service is configured to group publishing process data information in data sets, wherein each data set comprises signals and is assigned a multicast address; and
subscribe to process data information published in the network centric process control system via the middleware service, wherein the subscribing is made by another control service of said one or more of the plurality of nodes.

15. The computer program product according to claim 14, wherein the publishing and the subscribing are bound by multicast addresses.

* * * * *